United States Patent Office 2,823,171
Patented Feb. 11, 1958

2,823,171

SYNTHESIS OF STEROIDS OF THE 1-DEHYDRO-TESTOLOLACTONE SERIES

Josef Fried, New Brunswick, and Richard W. Thoma, Somerville, N. J., assignors to Olin Mathieson Chemical Corporation, New York, N. Y., a corporation of Virginia No Drawing. Application November 18, 1955
Serial No. 547,836

8 Claims. (Cl. 195—51)

This application is a continuation-in-part of our parent applications, Serial No. 331,333, filed January 14, 1953, now Patent No. 2,744,120, granted May 1, 1956, and Serial No. 543,243, filed October 27, 1955.

This invention relates to the microbiological conversion of steroids, and has for its object the provision of a process for converting steroids of the 21-unsubstituted-3,20-diketo-$\Delta^4$-pregnene series and of the androstane series to steroids of the 1-dehydrotestololactone series by means of certain microorganisms of the family Tuberculariaceae (preferably of the genera Cylindrocarpon and Fusarium). Thus, it has been found that the fungi Cylindrocarpon (especially *Cylindrocarpon radicicola*, although other species such as *Cylindrocarpon album* ATCC 12820 and *Cylindrocarpon ianthothele* ATCC 12821 can be used) and Fusarium (especially *Fusarium javanicum* var. *ensiforme*, although other species such as *Fusarium moniliforme* ATCC 10052, *Fusarium oxysporum* ATCC 7601, *Fusarium roseum* ATCC 12822 and *Fusarium solani* ATCC 12823 can be used) have a high order of activity in the microbiological conversion of this invention. The novel derivatives obtained by the process of this invention, namely, the 1-dehydrotestololactones (particularly 1-dehydrotestololactone and 11$\alpha$-hydroxy-1-dehydrotestololactone) are valuable steroid derivatives, as more fully disclosed in said parent applications.

In the practice of this invention, the conversion may be effected in a growing culture of the microorganism by either adding the steroid precursor to the culture during the incubation period, or by including it in the nutrient medium prior to inoculation. In any case, assimilable sources of nitrogenous material (for growth-promotion) and carbon-containing materials (as energy source) should be present in the culture medium. Also, an adequate, sterile air supply should be maintained during the conversion, e. g. by the conventional techniques of (1) exposing a large surface of the medium to air, or (2) submerged culture.

As the steroid substrate, either a steroid of the 21-unsubstituted-3,20-diketo-$\Delta^4$-pregnene series or a steroid of the androstane series may be used. Among the steroids of the former series which may be mentioned are: progesterone; 1-dehydroprogesterone; 11-dehydroprogesterone; hydroxyprogresterones, such as the 11$\alpha$, 11$\beta$ or 6$\beta$-hydroxy compounds; ketoprogesterones, such as the 11, 12 or 6-keto compounds; corticosterone; epicorticosterone; 11-dehydrocorticosterone; desoxycorticosterone; and 17$\alpha$-hydroxyprogesterone. Among the steroids of the androstane series which may be mentioned are: testosterone; 1-dehydrotestosterone; androstendione; $\alpha$-dehydroandrostendione; and $\Delta^5$-androstene-3, 17-diol.

The sources of nitrogenous, growth-promoting factors are those normally employed in such processes. They may be natural organics (e. g. soybean meal, cornsteep liquor, meat extract and/or distillers solubles) or synthetics such as nitrates and ammonium compounds.

Suitable energy-source material which may be utilized in the process of this invention includes: (a) lipids, especially (1) fatty acids having at least 14 carbon atoms, (2) fats, or (3) mixtures thereof, as exemplified by such fats as lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin; and such fatty acids as stearic, palmitic, oleic, linoleic and myristic acids; and (b) other carbon-containing materials as exemplified by glycerol, glucose, fructose, dextrose, sucrose, lactose, maltose, dextrins, starches and whey. These materials may be used either in purified state or as concentrates, such as whey concentrate, cornsteep liquor, or grain mashes (e. g. corn, wheat or barley mash). Mixtures of the above may, of course, be employed. Although the steroid itself may serve as the energy source, it is preferred, however, that the steroid substrate is added to the fermentation medium essentially as a precursor, and not as an energy source.

An adequate sterile-air supply should be maintained during fermentation, for example, by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period (or rather the time of subjecting the steroid to the action of the enzyme) may vary considerably, the range of about 6 to 96 hours being feasible, but not limiting.

Regardless of the species of Tuberculariaceae employed and the particular steroid precursor of the 21-unsubstituted-3,20-diketo-$\Delta^4$-pregnene series or of the androstane series used, at least one of the steroids formed in the process contains the 1-dehydrotestololactone nucleus. Thus, for example, *Cylindrocarpon radicicola* has been employed with steroid substrates such as progesterone and testosterone to form, inter alia, 1-dehydrotestololactone ($\Delta^1$-testololactone); and *Fusarium javanicum* var. *ensiforme* has been employed with steroid substrates such as progesterone to form, inter alia, 1-dehydrotestololactone and 11$\alpha$-hydroxy-1-dehydrotestololactone.

The following examples illustrate the invention:

EXAMPLE 1

(a) *Fermentation.*—A medium of the following composition is prepared: cornsteep liquor solids, 3.0 g.; $NH_4H_2PO_4$, 3.0 g.; $CaCO_3$, 2.5 g.; soybean oil, 2.2 g.; progesterone, 0.5 g.; and distilled water to make 1 liter. The medium is adjusted to pH 7.0±0.1. Then, 100 ml. portions of the medium are distributed in 500 ml. Erlenmeyer flasks, and the flasks plugged with cotton and sterilized in the usual manner (i. e., by autoclaving for 30 minutes at 120° C.). When cool, each of the flasks is inoculated with 5–10% of a vegetative inoculum of *Cylindrocarpon radicicola* ATCC 11011 (obtainable from the American Type Culture Collection, Washington, D. C. under catalogue number 11011), which has been grown from stock cultures (lyophilized vial or agar slant) for 48–72 hours in a medium of the following composition: cornsteep liquor solids, 15 g.; brown sugar, 10 g.; $NaNO_3$, 6 g.; $ZnSO_4$, 0.001 g.; $KH_2PO_4$, 1.5 g.; $MgSO_4 \cdot 7H_2O$, 0.5 g.; $CaCo_3$, 5 g.; lard oil, 2 g.; distilled water to make one liter. The flasks are then placed on a reciprocating shaker (120 one and one-half inch cycles per minute) and mechanically shaken at 25° C. for 3 days. The contents of the flasks are then pooled and, after the pH of the culture is adjusted to about 4.0±0.2 with sulfuric acid, filtered through Seitz filter pads to separate the mycelium from the fermented medium.

(b) *Extraction.*—The culture filtrate (40 liters) obtained in (a) is extracted with chloroform (40 liters) in an extractor (e. g., Podbelniak U. S. Patent 2,530,886, or improvements thereon) and the filtered chloroform is evaporated to dryness in vacuo. The residue (11.1 g.) is taken up in 200 ml. of 80% aqueous methanol, and the resulting solution is extracted four times with 100 ml. portions of hexane. The 80% aqueous methanol solution is then concentrated in vacuo until crystals appear; and, after cooling at 0° C. for several (usually about 3–4) hours, the crystals formed are recovered by filtration. About 2.9 g. of 1-dehydrotestololactone (M. P. 217–217.5° C.) are thus obtained. Concentration of the mother liquors yields additionally about 6.0 g. of the lactone. Recrystallization from acetone yields a purified 1-dehydrotestololactone having the following properties: M. P. 218–219° C.; $[\alpha]_D^{23}$ —44° (c, 1.20 in chloroform);

$\lambda_{max}^{alc}$ 242 m$\mu$ ($\epsilon=15{,}750$); $\lambda_{max}^{Nujol}$ 5.83 $\mu$ (lactone carbonyl), 6.01 $\mu$, and 6.15 $\mu$ ($\Delta^{1,4}$-3-keto).

Analysis: Calculated for $C_{19}H_{24}O_3$: C, 75.97; H, 8.05. Found: C, 76.29; H, 7.87.

The compound has the structural formula

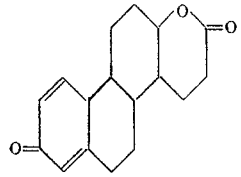

EXAMPLE 2

Following the procedures of Example 1, but substituting an equivalent amount of testosterone for the progesterone of that example, the same product is obtained. 1-dehydrotestololactone thus produced was found to have the following properties: M. P. 216–218° C.; $[\alpha]_D^{23}$ —45.6° (c, 1.24 in chloroform); infrared spectrum identical with that obtained using authentic 1-dehydrotestololactone; and no depression of melting points when mixed with authentic 1-dehydrotestololactone and the mixed melting point determined.

EXAMPLE 3

*11α-Hydroxy-1-dehydrotestololactone*

(a) *Fermentation.*—A fermentation medium of the following composition is prepared:

| | Grams |
|---|---|
| Starch | 20 |
| Malted cereal extract syrup | 10 |
| Peptone | 20 |
| Cerelose | 44 |
| NaNO$_3$ | 3 |
| KH$_2$PO$_4$ | 1 |
| KCl | 0.5 |
| MgSO$_4$·7H$_2$O | 0.5 |
| FeSO$_4$·7H$_2$O | 0.0183 |
| Water to make one liter. | |

The pH of the medium is adjusted to 7.0±0.1 with 2 N NaOH solution, and 50 ml. portions of the medium are distributed in 250 ml. Erlenmeyer flasks, and the flasks are plugged with cotton and sterilized by autoclaving for 30 minutes at 120° C. When cool, each of the flasks is inoculated with about one-fifth of the surface growth from a *Fusarium javanicum* var. *ensiforme* agar slant (obtainable, inter alia, from the Quartermaster Culture Collection, Quartermaster General Laboratories, Philadelphia, Pennsylvania and the American Type Culture Collection, Washington, D. C., under catalogue number 12575). The growth is obtained by growing the microorganism on Sabouraud Dextrose Agar (dextrose, 40 g.; neopeptone, 10 g.; agar 15 g.; distilled water to make 1,000 cc.) for 3 to 30 days.

The flasks are then mechanically shaken for 69 hours at 25° C. on a 280 cycle per minute rotary shaker, after which about 10% (v./v.) is transferred to each of 15 flasks containing the following medium:

| | Grams |
|---|---|
| Glucose | 20 |
| Starch | 20 |
| Peptone | 10 |
| NaNO$_3$ | 3 |
| KH$_2$PO$_4$ | 1 |
| KCl | 0.5 |
| MgSO$_4$·7H$_2$O | 0.5 |
| FeSO$_4$·7H$_2$O | 0.01 |
| Water to make one liter. | | and 0.05% of progesterone (total 375 mg.). After 72 hours of incubation, the flasks are harvested and the contents filtered through a Seitz clarifying pad and washed with three 50 ml. portions of water. The total volume of filtrate and wash is 750 ml.

(b) *Isolation of 1-dehydrotestololactone.*—The thus-obtained culture filtrate is extracted with three 800 ml. portions of chloroform and the combined chloroform extracts evaporated to dryness in vacuo. The residue from the chloroform solution (about 353 mg.) is dissolved in 2 ml. of chloroform and 10 ml. of benzene and chromatographed on 6 g. of silicagel. Elution with chloroform-benzene 2:5 (700 ml.) and 1:1 (150 ml.) produces 1-dehydrotestololactone, M. P. about 220–222° C.; $[\alpha]_D^{23}$ —47° (CHCl$_3$) identical in its infrared spectra with an authentic sample.

(c) *Isolation of the 11α-hydroxy-1-deyhdrotestololactone.*—Continued elution of the silicagel with 5% acetone in chloroform (950 ml.) and 25% acetone in chloroform (200 ml.) furnishes 11α-hydroxy-1-dehydrotestololactone, which after crystallization from acetone has the following properties: M. P. about 251–253° C.; $[\alpha]_D^{23}$ —58° (c, 0.95 in CHCl$_3$);

$\lambda_{max}^{alc}$ 244 m$\mu$ ($\epsilon=18{,}300$);

$\lambda_{Max}^{Nujol}$ 2.96$\mu$ (OH)

5.80 $\mu$ (lactone); 6.03 $\mu$, 6.18 $\mu$, 6.26 $\mu$ ($\Delta^{1,4}$-keto).

Analysis: Calcd. for $C_{19}H_{24}O_4$ (316.38); C, 72.12; H, 7.65. Found: C, 72.42; H, 7.90.

EXAMPLE 4

(a) *Fermentation.*—250 ml. flasks containing the first medium described in Example 3, section a, are inoculated with a growth of *Fusarium javanicum* var. *ensiforme*, prepared as in Example 3. The flasks are incubated as in Example 3 for 69 hours, after which about 4% (v./v.) transfer is made to each of 60 flasks containing the following medium:

| | Grams |
|---|---|
| Glucose | 20 |
| Starch | 20 |
| Peptone | 10 |
| NaNO$_3$ | 3 |
| KH$_2$PO$_4$ | 1 |
| KCl | 0.5 |
| MgSO$_4$·7H$_2$O | 0.5 |
| FeSO$_4$·7H$_2$O | 0.01 |
| Water to make one liter. | | and 0.05% of progesterone (total 1.5 g.). After 96 hours the contents of the flasks are filtered through a Seitz pad and washed with 200 ml. of water. Total volume of filtrate and wash is 1783 ml.

(b) *Isolation of 1-dehydrotestololactone and $\Delta^{1,4}$-androstadiene - 11α - ol - 3,17 - dione.*—The thus-obtained culture filtrate is extracted with three 1500 ml. portions of chloroform and the combined chloroform extracts evaporated to dryness in vacuo. The residue from the chloroform extract (1.1076 g.) is dissolved in 5 ml. of chloroform and 25 ml. of benzene and chromatographed on 22 g. of silicagel. Elution with chloroform-benzene 1:1 (900 ml.)

and with chloroform (225 ml.) yields 1-dehydrotestololactone (about 470 mg.), which is followed by $\Delta^{1,4}$-androstadiene-11α-ol-3,17-dione (about 197 mg.) when the eluant is changed to 5% acetone in chloroform (2100 ml.). The latter is identified by comparison with an authentic sample and by oxidation to $\Delta^{1,4}$-androstadiene-3,11,17-trione.

(c) *Isolation of the 11α - hydroxy - 1 - dehydrotestololactone and $\Delta^{1,4}$ - androstadiene - 11α,17β - diol - 3 - one.*—Continued elution with acetone-chloroform (1:4) (950 ml.) and 1:1 (200 ml.) furnishes a crystalline fraction (about 170 mg.) which melts at about 165–167° C. and which on crystallization behaves like a mixture. It is, therefore, dissolved in 1 ml. of chloroform and 1.5 ml. of benzene and rechromatographed on 2.2 g. of sulfuric acid-washed alumina. Elution with chloroform-benzene 2:3 (300 ml.) furnishes 11α-hydroxy-1-dehydrotestololactone (about 10 mg.) which after recrystallization from ethyl acetate melts at about 250° C. and whose infrared spectrum is identical with that of an authentic sample. Subsequent elution with chloroform (300 ml.) and with 5% acetone in chloroform (100 ml.) yields $\Delta^{1,4}$-androstadiene-11α,17β-ol-3-one, identified by its melting point (about 183–185° C.) and by infrared comparison with an authentic sample.

Similarly, by substituting other steroid subtrates for the progesterone of Examples 1, 3 and 4 or the testosterone of Example 2, 1-dehydrotestololactone and/or 11α-hydroxy-1-dehydrotestololactone are produced. Thus, 11α-hydroxyprogesterone yields 11α-hydroxy-1-dehydrotestololactone, and 11-ketoprogesterone yields 11-keto-1-dehydrotestololactone.

The invention may be otherwise variously embodied within the scope of the appended claims.

We claim:

1. The process for preparing a steroid of the 1-dehydrotestololactone series, which comprises subjecting a steroid selected from the group consisting of a member of the 21-unsubstituted-3,20-diketo-$\Delta^4$-pregnene series and a member of the androstane series to the action of the enzymes of fungi of the genera selected from the group consisting of Cylindrocarpon and Fusarium in an aqueous medium containing assimilable sources of carbon and nitrogen, and recovering from the medium the 1-dehydrotestololactone produced.

2. The process of claim 1, wherein the fungus is *Cylindrocarpon radicicola*.

3. The process of claim 1, wherein the fungus is *Fusarium javanicum* var. *ensiforme*.

4. The process of claim 1, wherein the steroid is progesterone.

5. The process of claim 1, wherein the steroid is testosterone.

6. The process of claim 2 wherein the steroid is progesterone and 1-dehydrotestololactone is recovered as the product.

7. The process of claim 2 wherein the steroid is testosterone and 1-dehydrotestololactone is recovered as the product.

8. The process of claim 3 wherein the steroid is progesterone and 1-dehydrotestololactone and 11α-hydroxy-1-dehydrotestololactone are recovered as the products.

References Cited in the file of this patent

Bessey: Morphology and Taxonomy of Fungi, 1950, The Blakiston Company, Philadelphia, pages 15–18.

Vischer et al.: Experientia, IX, No. 10, 1953, pages 371–372.

Jour. Am. Chem. Soc. 75, November 20, 1953, pages 5764, 5765, 5768, 5769.